(12) United States Patent
Chen et al.

(10) Patent No.: US 8,559,623 B2
(45) Date of Patent: Oct. 15, 2013

(54) DOUBLE SLIDING STABILITY SPACE-SAVING SLIDE COVER LIFTING STRUCTURE

(75) Inventors: Chia Hui Chen, Taoyuan (TW); Che-Hsien Lin, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 378 days.

(21) Appl. No.: 13/156,672

(22) Filed: Jun. 9, 2011

(65) Prior Publication Data
US 2012/0314980 A1  Dec. 13, 2012

(51) Int. Cl.
*H04M 1/00* (2006.01)
*H04M 9/00* (2006.01)
*E05D 7/00* (2006.01)
*H04M 1/02* (2006.01)

(52) U.S. Cl.
CPC ............... *H04M 1/0237* (2013.01); *E05D 7/00* (2013.01)
USPC ...................... 379/433.12; 455/575.4; 16/327

(58) Field of Classification Search
USPC .......... 379/433.11, 433.12; 455/575.1, 575.3, 455/575.4; 361/679.02, 679.09, 679.15, 361/679.21, 679.22, 679.27; 16/327, 354, 16/357, 366
See application file for complete search history.

(56) References Cited

U.S. PATENT DOCUMENTS

| | | | |
|---|---|---|---|
| 7,725,988 B2 * | 6/2010 | Kim et al. | 16/361 |
| 2007/0084015 A1 * | 4/2007 | Zuo et al. | 16/354 |
| 2008/0196201 A1 * | 8/2008 | Anderson | 16/232 |
| 2010/0265686 A1 * | 10/2010 | Kilpinen | 361/807 |

* cited by examiner

*Primary Examiner* — Tuan D Nguyen
(74) *Attorney, Agent, or Firm* — Guice Patents PLLC (57) ABSTRACT

A double sliding stability space-saving slide cover lifting structure used in an electronic device consisting of a base member and a cover panel is disclosed to include a pair hinges, a pair of sliding rail holders, a pair of bearing members, a pair of plastic slide guides, a pair of sliding rails, a pair of gears and a pair of gear racks is disclosed. The sliding rails are respectively slidably coupled to channel bars of the plastic slide guides in the bearing members, enhancing sliding stability. Further, the bearing members are prepared by a high load strength material and fixedly mounted on the sliding rail holders to support the plastic slide guides and the sliding rails, saving the space and enhancing the cover panel connection stability and preventing gear slippage and uneven bias of the cover panel.

12 Claims, 11 Drawing Sheets

FIG. 12 ized. Further, when the cover panel is opened from the base member, the sheet plate bracket mechanisms are forced into engagement with the supplementary support mechanisms to support the cover panel in position for enabling the user to operate the display screen of the cover panel positively.

DOUBLE SLIDING STABILITY SPACE-SAVING SLIDE COVER LIFTING STRUCTURE

BACKGROUND OF THE INVENTION

1. Field of the Invention

The present invention relates to slide cover mounting technology and more particularly, to a double sliding stability space-saving slide cover lifting structure for use in an electronic device, for example, tablet computer, for allowing the top cover panel of the electronic device to be moved smoothly and stably in horizontal relative to the base panel thereof and then lifted from a horizontal position to a tilted position.

2. Description of the Related Art

Following development and function improvement of touch control technology, tablet computer has become popular. The LCD screen of a tablet computer is located on the outer surface of the computer for convenient operation.

However, the use of a keyboard is a common practice to most people for, for example, text word input. There are tablet computers that comprise an operating system end arranged at the bottom side of the LCD display panel. Thus, the LCD display panel can be moved horizontally relative to the operating system end and then lifted to a tilted position so that the user can use the keyboard on the operating system end.

To satisfy this operation, a special slide cover mounting arrangement is necessary. The known slide cover mounting arrangement comprises a pair of hinges, a pair of sliding rail holders and sliding rails. However, this design does not allow smooth lifting of the LCD display panel. Gear and gear rack may be added to distribute the applied push force evenly. However, the gear will be disengaged from the gear rack when the user lifts the LCD display panel from the operating system end, and will be pushed back into engagement with the gear rack when the user closes the LCD display panel. Because the gear is not constantly kept in mesh with the gear rack, the LCD display panel may be erroneously biased from position.

U.S. patent application Ser. No. 12/986,353 discloses a slide cover design invented by the present invention and entitled "SLIDE COVERF MOUNTING STRUCTURE", which includes two hinges bilaterally mounted on the top wall of the base member, two sliding rail holders respectively connected to the non-circular pivot shafts of the hinges, two sliding rails bilaterally mounted on the bottom surface of the cover panel and respectively slidably coupled to a sliding groove on each of the sliding rail holders, two gears pivotally connected between fixed rails on the sliding rail holders, and two gear racks respectively mounted on the cover panel and meshed with the gears. Thus, the cover panel is prohibited from biasing during sliding movement, and turnable about the non-circular pivot shafts of the hinges from a horizontal position to a tilted position relative to the base member.

U.S. patent application Ser. No. 13/035,121 discloses a slide cover design invented by the present invention and entitled "LIFTABLE SLIDE COVER MOUNTING STRUCTURE USING A SHEET METAL BRACKET MECHANISM", which consists of two hinges, two metal sheet bracket mechanism, two sliding rails, two gears, two gear racks and two supplementary support mechanisms. Subject to the use of the sheet plate bracket mechanisms to hold the sliding rails instead of zinc alloy sliding rail holders, the weight of the liftable slide cover mounting structure is minimized. Further, when the cover panel is opened from the base member, the sheet plate bracket mechanisms are forced into engagement with the supplementary support mechanisms to support the cover panel in position for enabling the user to operate the display screen of the cover panel positively.

In the aforesaid prior art designs, the sliding rails and the gear racks are arranged in a parallel manner, occupying much surface space. In consequence, the size of the tablet PC cannot be minimized. In order to save space, U.S. patent application Ser. No. 13/095,793, which was also invented by the present inventor, discloses a new design entitled "Space-saving slide cover lifting structure", which consists of a pair hinges, a pair of sliding rail holders, a pair of plastic slide guides, a pair of sliding rails, a pair of gears and a pair of gear racks is disclosed. The gear racks are respectively accommodated in the sliding rails to reduce space occupation, minimizing the width of the assembly of the gear rack and the respective sliding rail. The arrangement of the plastic slide guides prohibits direction contact between the metal sliding rails and the sliding rail holders, avoiding friction noise. However, the single-sided coupling arrangement between the sliding rails and the plastic are slidably coupled to the plastic slide guides are less stable. Further, the sliding rail holders are single-piece members that are not strong enough to support a high load and require much installation space.

SUMMARY OF THE INVENTION

The present invention has been accomplished under the circumstances in view. It is main object of the present invention to provide a double sliding stability space-saving slide cover lifting structure for use in an electronic device comprising a cover panel and a base member, which eliminates the drawbacks of the aforesaid prior art design.

To achieve this and other objects of the present invention, a double sliding stability space-saving slide cover lifting structure is used in an electronic device comprising a cover panel and a base member, comprising: two hinges respectively fixedly mounted in a respective recessed portion on a middle part of a top wall of the base member adjacent to two opposite lateral sides of the base member, each hinge comprising a non-circular pivot shaft and a torque providing device; two sliding rail holders respectively connected to the non-circular pivot shafts of the two hinges and rotatable with the associating non-circular pivot shafts relative to the base member, each sliding rail holder comprising a connection block connected to the non-circular pivot shaft of the associating hinge; two bearing members prepared by a high load strength material and respectively affixed to the sliding rail holders, each bearing member having two grooves disposed at two opposite lateral sides thereof; two plastic slide guides respectively formed of a pair of channel bars and respectively fixedly mounted in the grooves of the bearing members, each channel bar defining a sliding groove; two sliding rails bilaterally fixedly mounted on a bottom surface of the cover panel in a parallel manner, each sliding rail comprising a flat, elongated base panel affixed to the cover panel, an angled rail extending along each of two opposite lateral side of the flat, elongated base panel and respectively slidably coupled to the sliding grooves of the channel bars of the plastic slide guides; an axle having two distal ends thereof respectively pivotally coupled to the sliding rail holders; two gears respectively mounted on the axle near the sliding rail holders, each gear having the gear teeth thereof partially and upwardly inserted through the sliding rail holder and the bearing members; and two gear racks respectively affixed to the flat, elongated base panels of the sliding rails and respectively meshed with the gears.

The two sliding rails are moved with the cover panel in the sliding grooves of the plastic slide guides relative to the base member when the cover panel receives a horizontal push force, and the gear racks are simultaneously moved with the cover panel to rotate the gears, enabling the horizontal push force to be transferred through the gears to two opposite lateral sides of the base member to prohibit the cover panel from biasing during sliding movement. Further, the gears are kept meshed with the gear racks constantly for enabling the cover panel to be turned about the non-circular pivot shafts of the hinges from a horizontal position to a tilted position relative to the base member.

According to this design, the angled rail portion of the sliding rails are respectively slidably coupled to the sliding grooves of the channel bars of the plastic slide guides in the grooves of the bearing members, enhancing sliding stability. Further, the high load strength bearing members are fixedly mounted on the sliding rail holders to support the plastic slide guides and the sliding rails, saving the space and enhancing the cover panel connection stability. Thus, the invention effectively prevents gear slippage and uneven bias of the cover panel.

Further, each bearing member has a spring plate fixedly mounted at a rear end thereof. The spring plate comprises a mounting portion affixed to the associating bearing member, and a spring leaf projecting into the sliding groove of one channel bar of the associating plastic slide guide and stopped against one angled rail portion of the associating sliding rail. Further, each angled rail portion of each sliding rail comprises a first notch and a second notch for selectively receiving the spring leaf of the associating spring plate for positive positioning.

Further, the sliding rails and the related component parts can be mounted on the back cover of the display screen in the top cover panel of the electronic device near its two opposite lateral sides.

DETAILED DESCRIPTION OF THE PREFERRED EMBODIMENT

Figure 1:
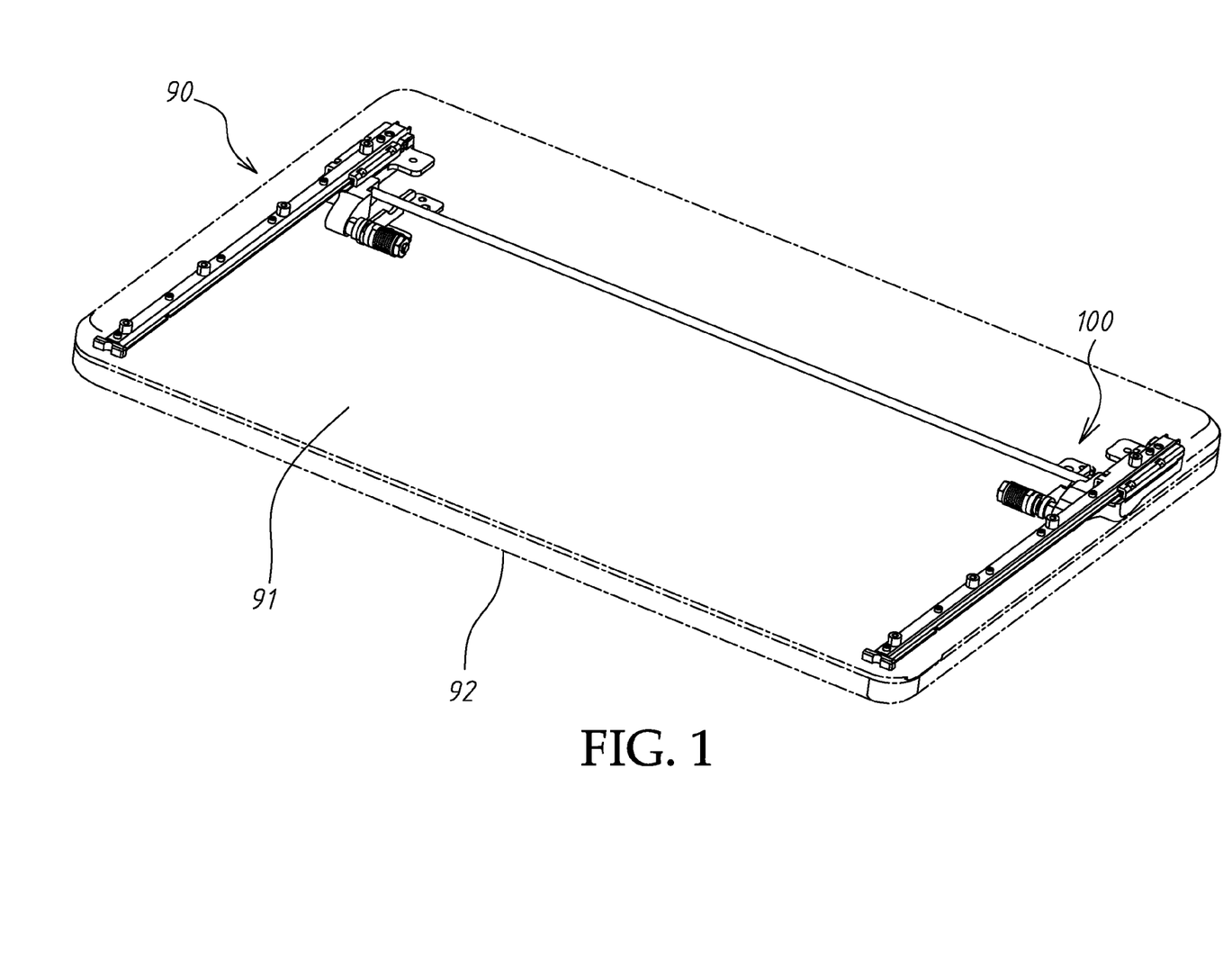
FIGS. 1~3 illustrate the use of a double sliding stability space-saving slide cover lifting structure in an electronic device in accordance with a first embodiment of the present invention.
Figure 2:
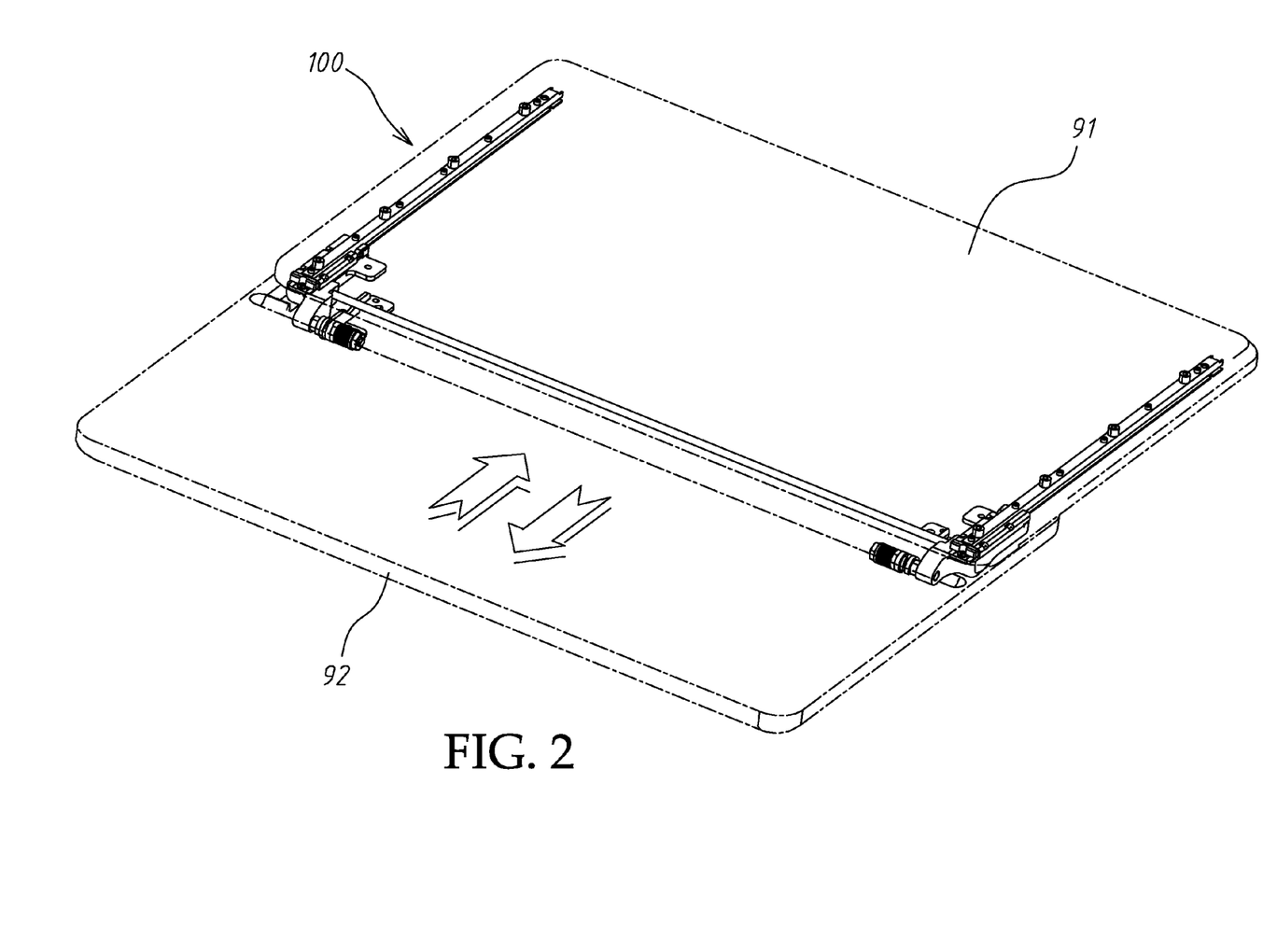
Figure 3:
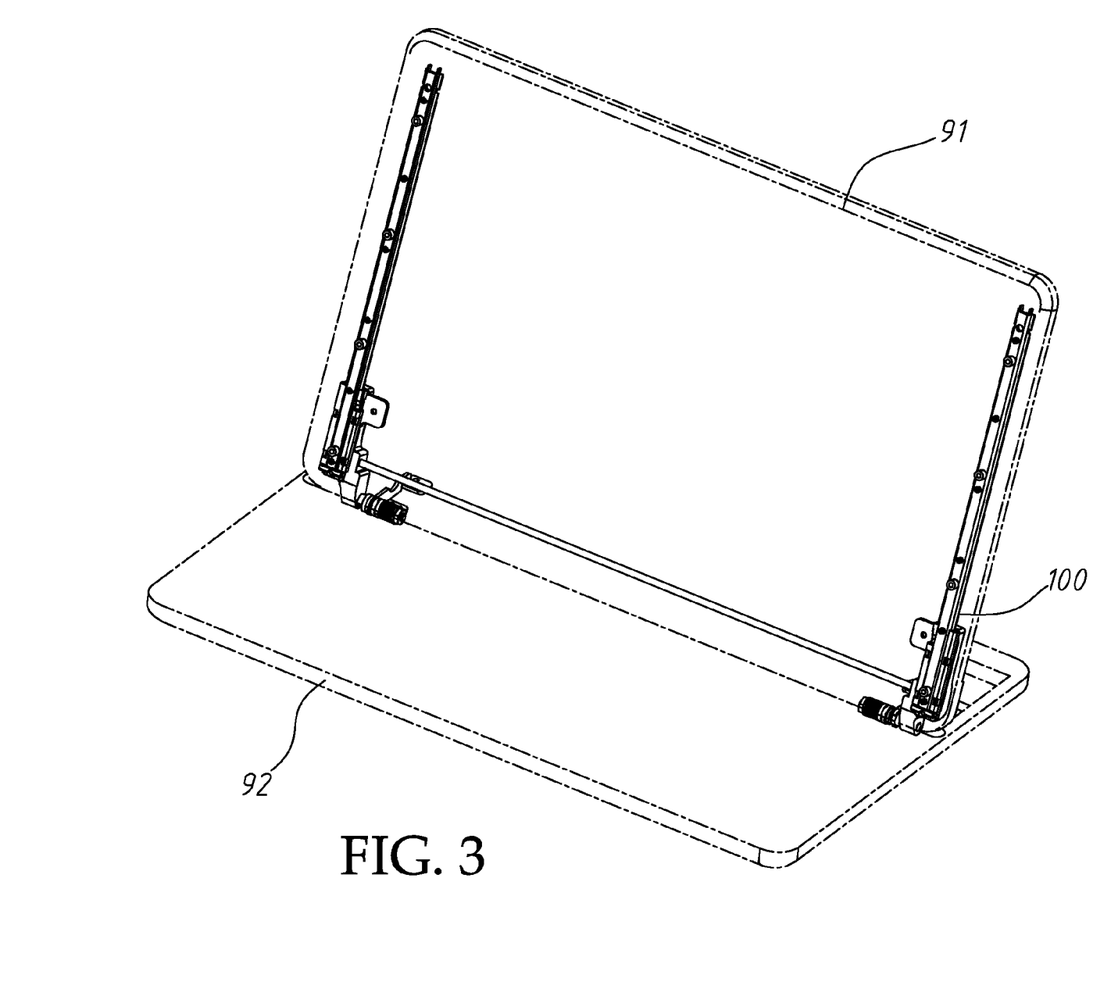

Referring to FIGS. 1~3, a double sliding stability space-saving slide cover lifting structure 100 in accordance with a first embodiment of the present invention is shown used in an electronic device 90 comprising a cover panel 91 and a base member 92. The electronic device 90 can be, for example, a tablet computer. The cover panel 91 is a LCD display panel. The base member 92 is the operating system end of the electronic device 90, comprising a keyboard. When opening the cover panel 91, move the cover panel 91 horizontally relative to the base member 92 (see FIG. 2), and then bias the cover panel 91 to a tilted position relative to the base member 92 (see FIG. 3).

Figure 4:
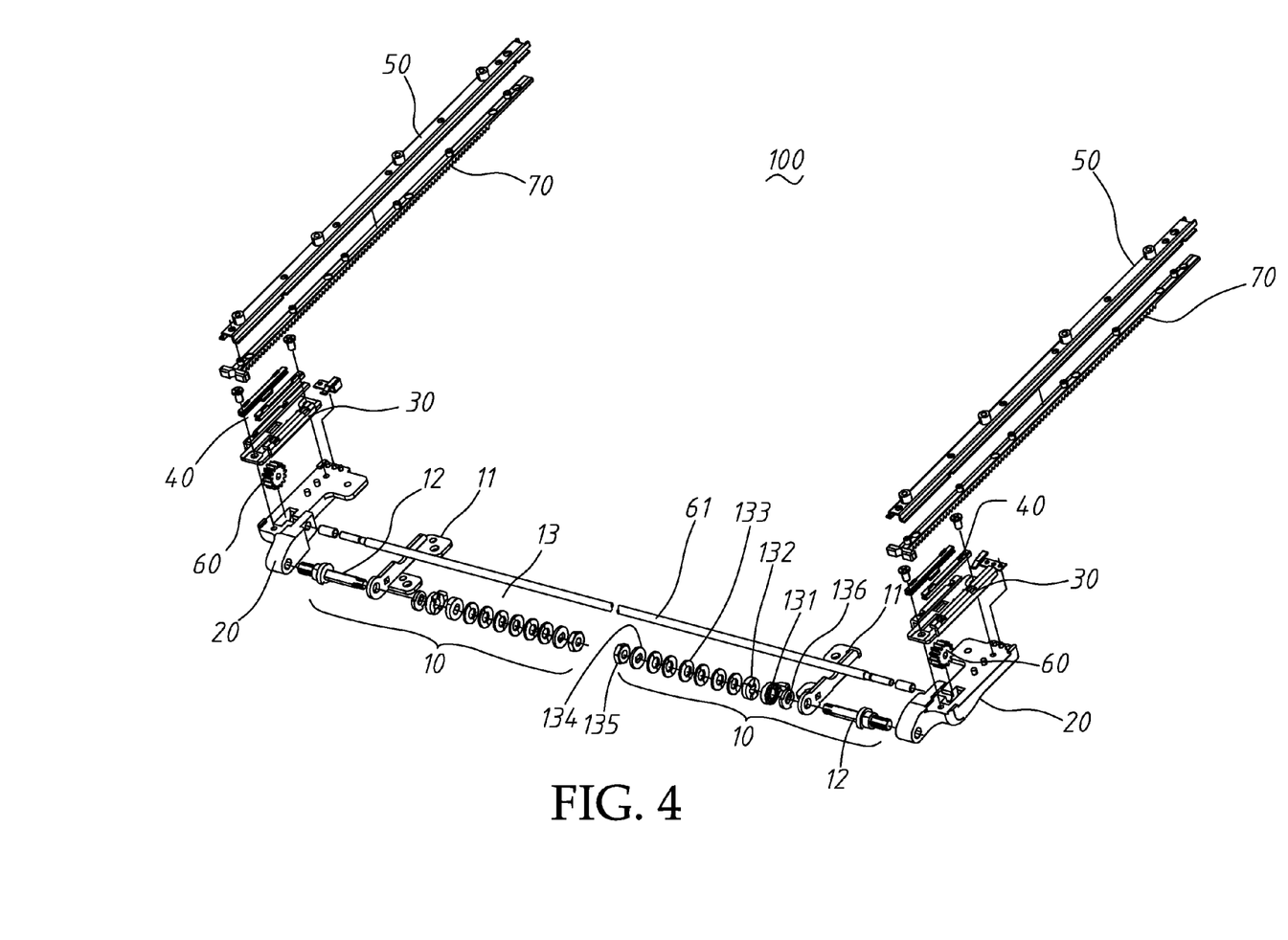
FIG. 4 is an exploded view of the double sliding stability space-saving slide cover lifting structure in accordance with the first embodiment of the present invention.
Figure 5:
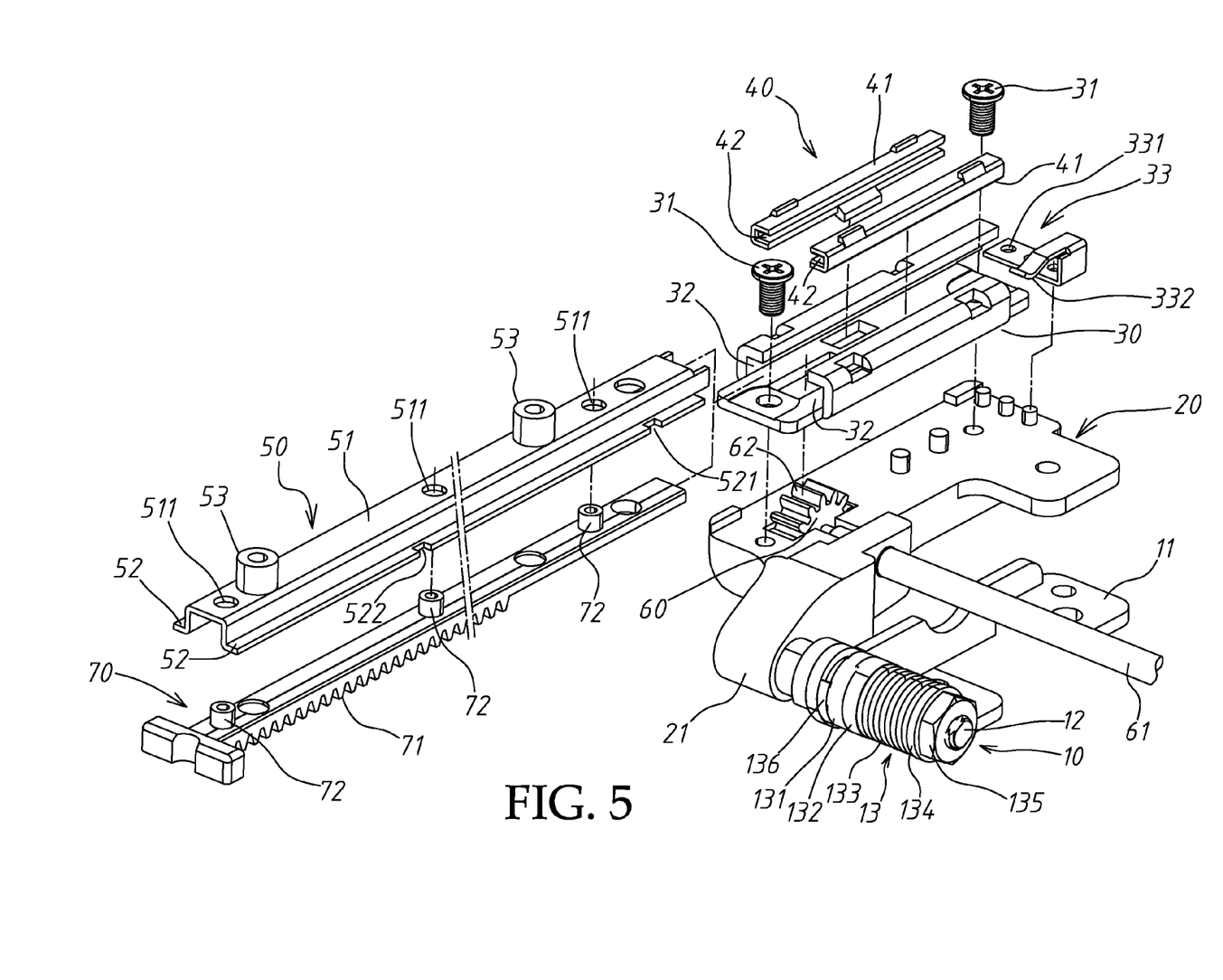
FIG. 5 is an exploded view, in an enlarged scale, of a part of the double sliding stability space-saving slide cover lifting structure in accordance with the first embodiment of the present invention.
Figure 6:
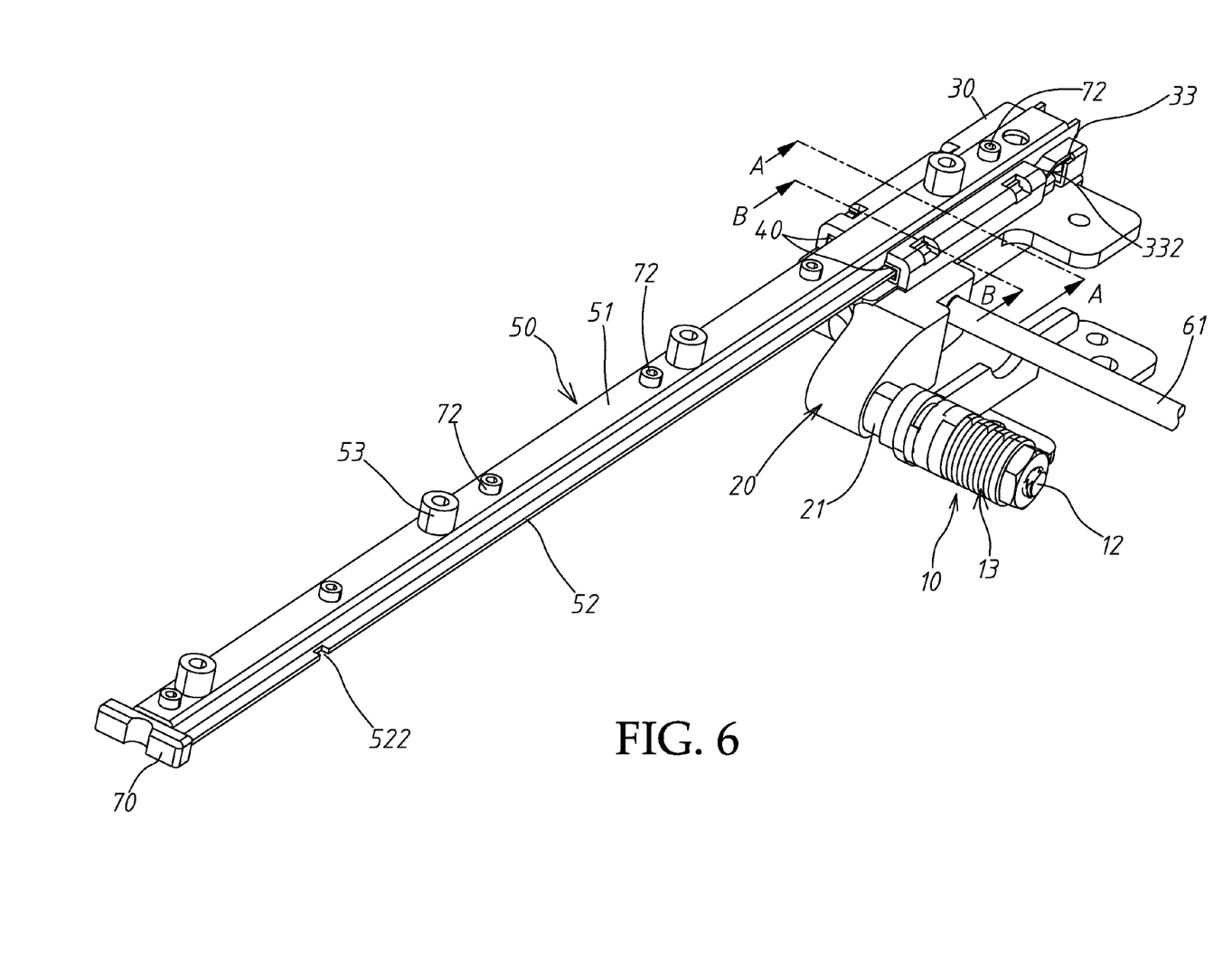
FIG. 6 is an elevational assembly view of the component parts shown in FIG. 5.

Referring to FIGS. 4~5, the slide cover lifting structure 100 comprises a pair hinges 10, a pair of a pair of sliding rail holders 20, a pair of bearing members 30, a pair of plastic slide guides 40, a pair of sliding rails 50, a pair of gears 60 and a pair of gear racks 70. These component pairs are symmetrically mounted on two distal ends of an axle 61 (see FIG. 4).

The hinges 10 are respectively fixedly mounted in a respective recessed portion 921 on a middle of the top wall of the base member 92 adjacent to the two opposite lateral sides of the base member 92, each comprising a bracket 11, which is affixed one respective portion 921 of the base member 92, a non-circular pivot shaft 12 pivotally coupled to the bracket 11, and a torque providing device 13. The torque providing device 13 comprises a concave wheel 131 and a cam wheel 132 mounted on the non-circular pivot shaft 12, a set of spring washers 133 mounted on the non-circular pivot shaft 12 and stopped against the concave wheel 131 and the cam wheel 132, a flat washer 134 mounted on the non-circular pivot shaft 12 and stopped at one side of the spring washers 133 against the concave wheel 131 and the cam wheel 132, a locknut 135 threaded onto one end of the non-circular pivot shaft 12 and stopped at one side of the flat washer 134 opposite to the spring washers 133, and a stop plate 136 mounted on the non-circular pivot shaft 12 and stopped between the bracket 11 and the concave wheel 131. Thus, the spring washers 133 is forced by the locknut 135 and the flat washer 134 to impart a pressure to the concave wheel 131 and the cam wheel 132. Further, the stop plate 136 has a sector part thereof adapted for stopping against a protruded block of the bracket 11 to limit the angle of rotation of the non-circular pivot shaft 12 relative to the bracket 11. The structural arrangement of the hinges 10 can be seen in FIG. 4.

Each sliding rail holder 20 comprises a connection block 21 located on the bottom side thereof, and a non-circular coupling hole 22 formed in the connection block 21 and coupled to the non-circular pivot shaft 12 of one of the hinges 10 for allowing rotation of the respective sliding rail holder 20 with the associating non-circular pivot shaft 12 relative to the base member 92.

The bearing members 30 are prepared by a high load strength material and respectively affixed to the sliding rail holders 20 with screw nails 31, each having two grooves 32 disposed at two opposite lateral sides thereof.

The plastic slide guides 40 are respectively formed of a pair of channel bars 41 and respectively fixedly mounted in the grooves 32 of the bearing members 30. Each channel bar 41 defines a sliding groove 42.

Figure 7:
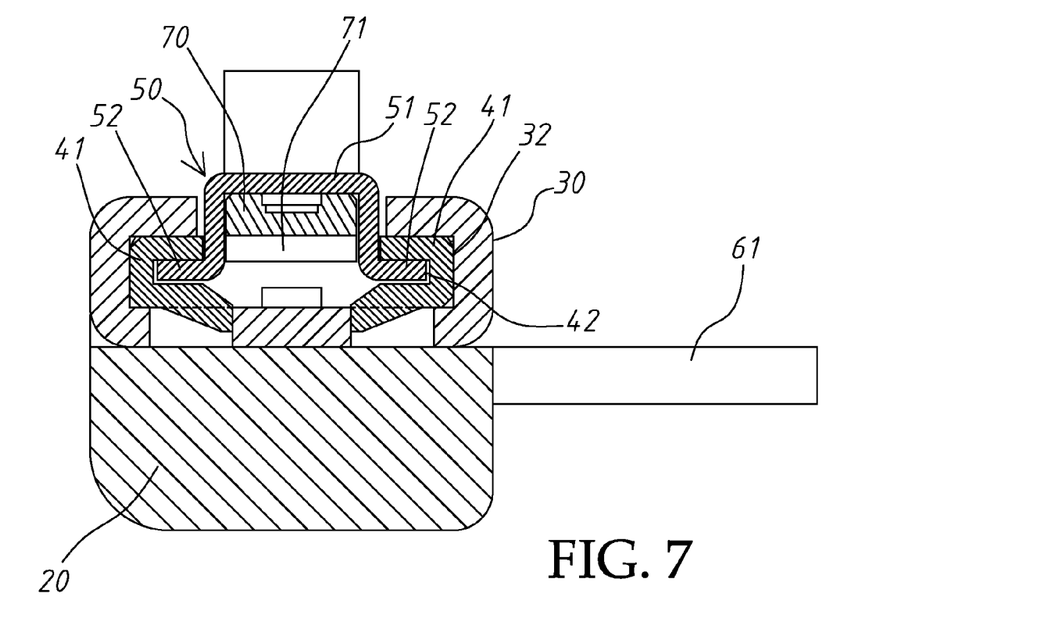
FIG. 7 is a sectional view taken along line A-A of FIG. 6.

The sliding rails 50 are bilaterally fixedly mounted on the bottom surface of the cover panel 91 in a parallel manner, and respectively slidably coupled to the sliding grooves 42 of the plastic slide guides 40. As illustrated in FIG. 7, each sliding rail 50 comprises a flat, elongated base panel 51 affixed to the bottom surface of the cover panel 91, an angled rail portion 52 extending along one lateral side of the flat, elongated base panel 51 and slidably coupled to the sliding grooves 42 of the plastic slide guides 40. Further, the flat, elongated base panel 51 is affixed to the bottom surface of the cover panel 91 with screws 53.

Further, a spring plate 33 is provided at the rear end of each bearing member 30. The spring plate 33 comprises a mounting portion 331 affixed to the top surface near the rear end of the associating bearing member 30, and a spring leaf 332 projecting into the sliding groove 42 of one channel bar 41 of the associating plastic slide guide 40 and stopped against one angled rail portion 52 of the associating sliding rail 50. Further, each angled rail portion 52 of each associating sliding rail 50 comprises a first notch 621 and a second notch 522. When sliding rails 50 are moved with the cover panel 91 relative to the base member 92 to one of two opposing end limit positions (see FIG. 1 and FIG. 2), the spring leaves 332 of the spring plates 33 are respectively engaged into the first notches 521 or second notches 422 of the sliding rails 50, achieving positioning accurately. The arrangement of the spring plates 33 to match with the arrangement of the sliding rails 50 in between the back wall of the display screen in the cover panel 91 and the inner wall of the cover panel 91, friction trace is kept from sight, and therefore the sense of beauty of the electronic device 90 is maintained intact.

Figure 8:
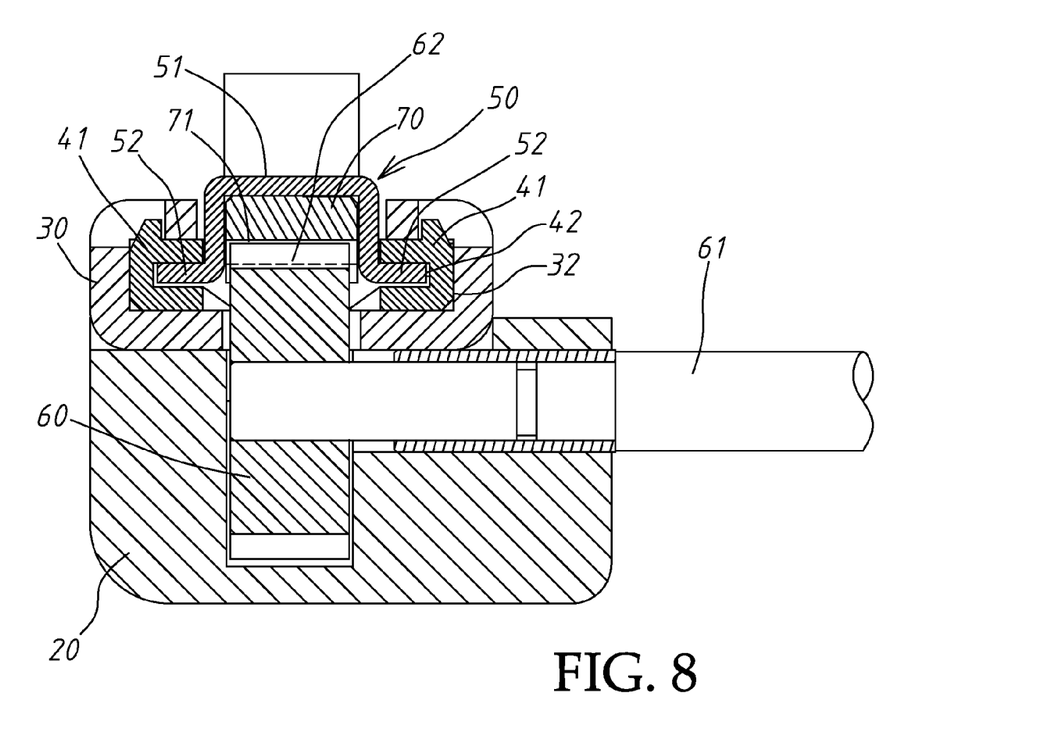
FIG. 8 is a sectional view taken along line B-B of FIG. 6.

The gears 60 are respectively mounted on the axle 61 near its two distal ends. The two distal ends of the axle 61 are respectively pivotally coupled to the sliding rail holders 20 to support the gears 60 in such a position that the teeth 62 of the gears 60 are partially upwardly inserted through the respective sliding rail holder 20 and the respective bearing members 30, as shown in FIG. 8.

The gear racks 70 are respectively affixed to the bottom walls of the flat, elongated base panels 51 of the sliding rails 50, keeping the respective tooth faces 71 in mesh with the teeth 62 of the gears 60. Further, the flat, elongated base panel 51 of each sliding rail 50 further comprises a plurality of round holes 511. Further, each gear rack 70 further comprises a plurality of pins 72 respectively inserted into the round holes 511 of the associating sliding rail 50 and heat sealed thereto to secure the respective gear rack 70 to the respective sliding rail 50.

As stated above, the slide cover lifting structure 100 of the present invention is used in the electronic device 90. When the cover panel 91 receives a horizontal push force, it will slide forwards relative to the base member 92 (see FIG. 2). At this time, the sliding rails 40 are moved in the sliding grooves 31 of the associating slide guides 30, and at the same time, the gear racks 60 are forced to rotate the gears 50, enabling the horizontal push force to be evenly transferred through the axle 51 to the two opposite lateral sides of the base member 92, avoiding uneven biasing of the cover panel 91 during its sliding movement.

As stated above, the double sliding stability space-saving slide cover lifting structure 100 of the present invention is used in the electronic device 90. When the cover panel 91 receives a horizontal push force, it will slide forwards relative to the base member 92 (see FIG. 2). At this time, the angled rail portion 52 of the sliding rails 50 are moved in the sliding grooves 42 of the channel bars 41 of the plastic slide guides 40, and at the same time, the gear racks 70 are forced to rotate the gears 60, enabling the horizontal push force to be evenly transferred through the axle 61 to the two opposite lateral sides of the base member 92, avoiding biasing of the cover panel 91 during its sliding movement. Further, the cover panel 91 can be forced by a biasing force to turn about the non-circular pivot shafts 12 of the hinges 10 in direction away from the base member 92 to a tilted position (see FIG. 3). During biasing of the cover panel 91, the gears 60 are constantly kept in mesh with the gear racks 70.

According to the present invention, the angled rail portion 52 of the sliding rails 50 are respectively slidably coupled to the sliding grooves 42 of the channel bars 41 of the plastic slide guides 40 in the grooves 32 of the bearing members 30, enhancing sliding stability. Further, the high load strength bearing members 30 are fixedly mounted on the sliding rail holders 20 to support the plastic slide guides 40 and the sliding rails 50, saving the space and enhancing the cover panel 91 connection stability. Thus, the invention effectively prevents gear slippage and uneven bias of the cover panel 91.

Figure 9:
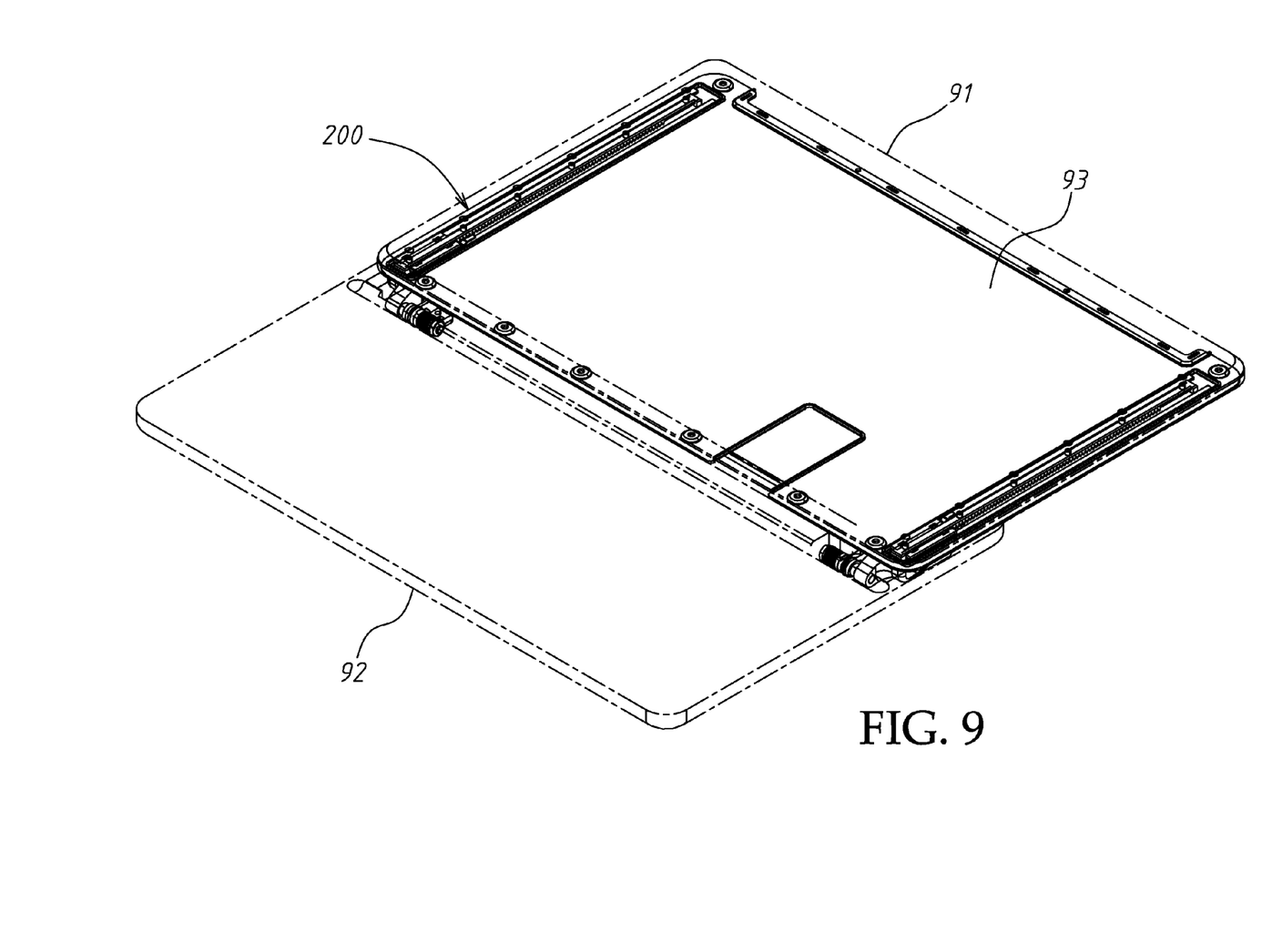
FIG. 9 is a schematic drawing illustrating a double sliding stability space-saving slide cover lifting structure used in an electronic device in accordance with a second embodiment of the present invention.
Figure 10:
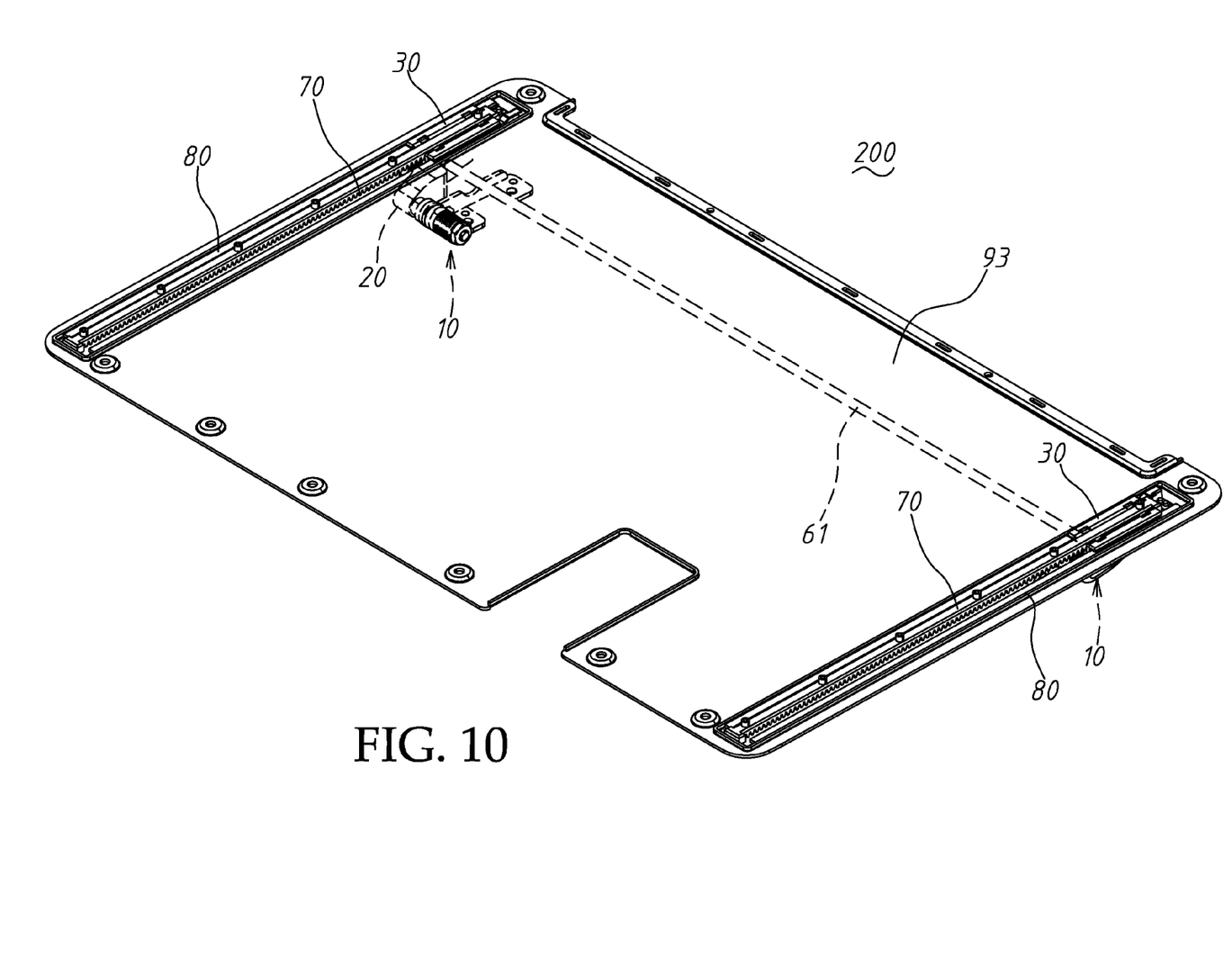
FIG. 10 is a perspective assembly view of the double sliding stability space-saving slide cover lifting structure in accordance with the second embodiment of the present invention.
Figure 11:
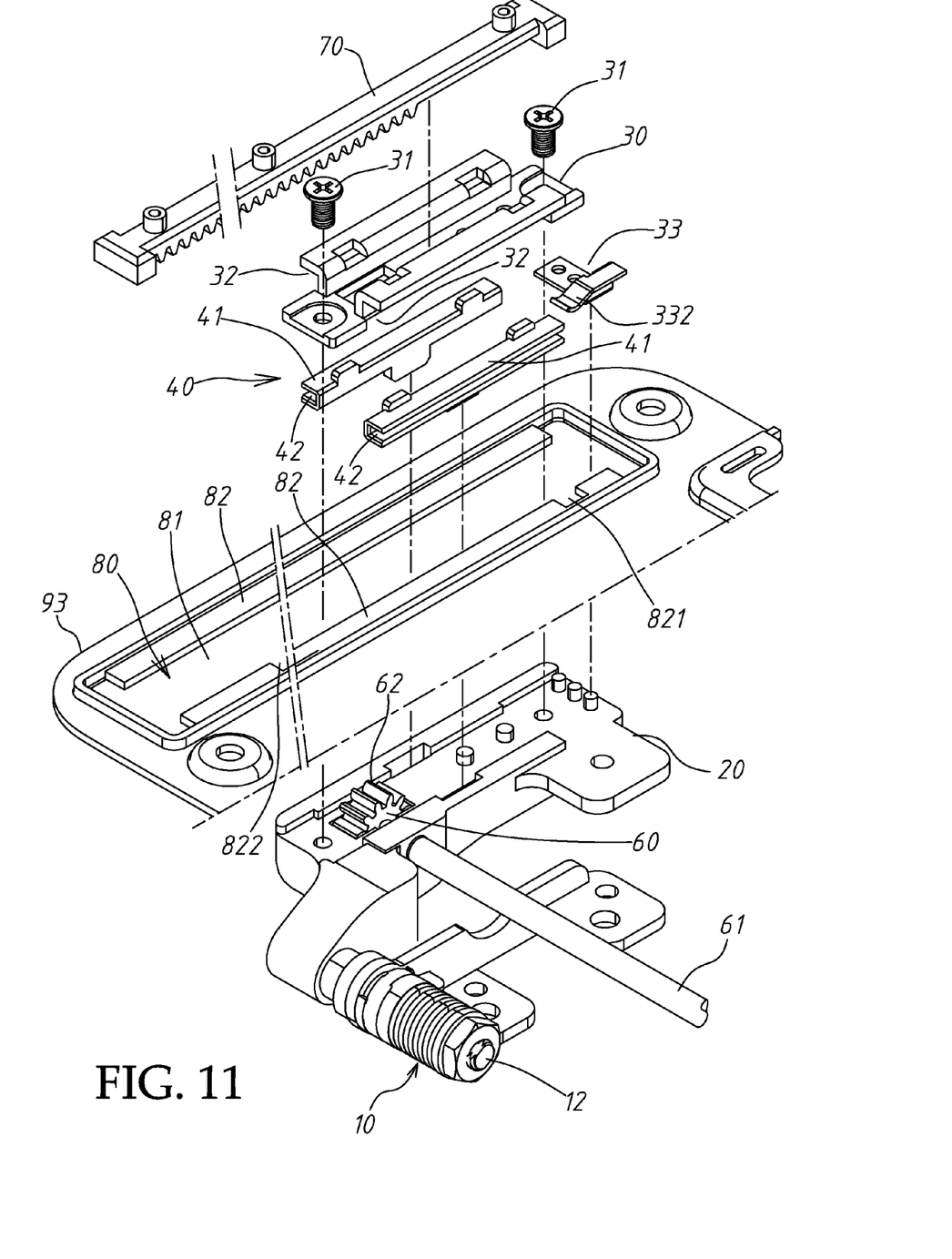
FIG. 11 is an exploded view of a part of the double sliding stability space-saving slide cover lifting structure in accordance with the second embodiment of the present invention.

FIGS. 9~11 illustrate a double sliding stability space-saving slide cover lifting structure 200 in accordance with a second embodiment of the present invention. This second embodiment is substantially similar to the aforesaid first embodiment with the exception that the sliding rails 50 are directly mounted in the cover panel 91 at the back cover 93 of the display screen, saving the space.

As illustrated, the double sliding stability space-saving slide cover lifting structure 200 comprises, a pair of hinges 10, a pair of sliding rail holders 20, a pair of bearing members 30, a pair of plastic slide guides 40, a pair of sliding rails 80, a pair of gears 60 and a pair of gear racks 70. As shown in FIG. 11, the sliding rails 80 are respectively arranged at the back cover 93 of the display screen at two opposite lateral sides, each comprising a longitudinal slot 81 and two rail portions 82 arranged in a parallel manner in the longitudinal slot 81.

The hinges 10 and the sliding rail holders 20 are connected together in such a manner that the sliding rail holders 20 are rotatable upwardly with the non-circular pivot shafts 12 relative to the base member 92. The bearing members 30 are prepared by a high load strength material and affixed to the sliding rail holders 20 with screw nails 31, each having two grooves 32 disposed at two opposite lateral sides thereof. The plastic slide guides 40 are respectively formed of a pair of channel bars 41 and respectively fixedly mounted in the grooves 32 of the bearing members 30. Each channel bar 41 defines a sliding groove 42.

Figure 12:
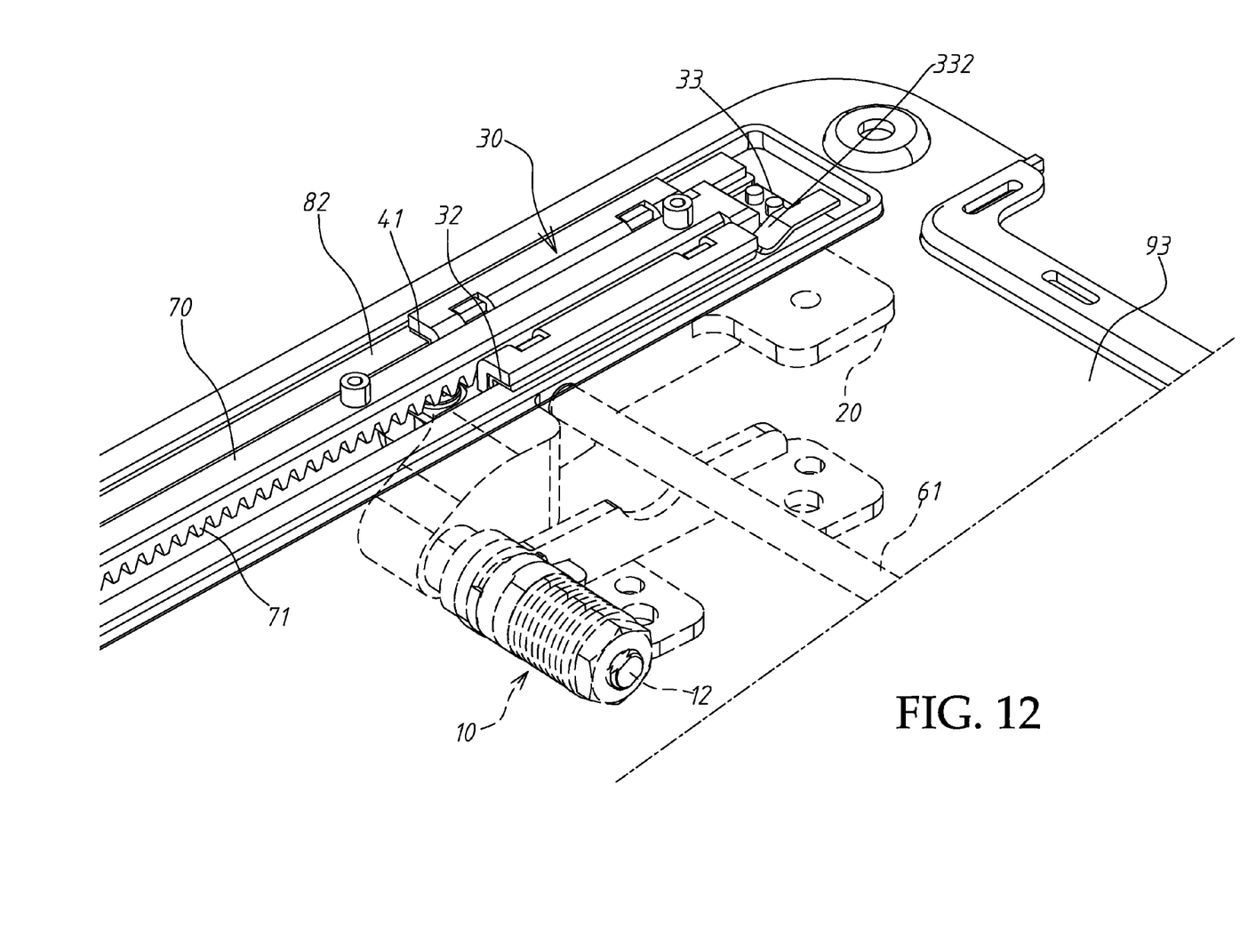
FIG. 12 is an elevational assembly view, in an enlarged scale, of a part of the double sliding stability space-saving slide cover lifting structure in accordance with the second embodiment of the present invention.

As shown in FIG. 12, the rail portions 82 of the sliding rails 80 are respectively slidably coupled to the sliding grooves 42 of the channel bars 41 of the plastic slide guides 40. Further, a spring plate 33 is provided at the rear end of each bearing member 30. The spring plate 33 comprises a mounting portion 331 affixed to the top surface near the rear end of the associating bearing member 30, and a spring leaf 332 stopped against one rail portion 82 of the associating sliding rail 80. One rail portion 82 of each sliding rail 80 has a first notch 821 and a second notch 822.

When sliding rails 80 are moved with the cover panel 91 relative to the base member 92 to one of two opposing end limit positions, the spring leaves 332 of the spring plates 33 are respectively engaged into the first notches 821 or second notches 822 of the sliding rails 80, achieving positioning accurately.

Further, the gears 60 are respectively mounted on the axle 61 near its two distal ends. The two distal ends of the axle 61 are respectively pivotally coupled to the sliding rail holders 20 to support the gears 60 in such a position that the teeth 62 of the gears 60 are partially upwardly projecting into the respective sliding rail holder 20 and the respective bearing members 30. Further, the gear racks 70 are respectively positioned in the longitudinal slot 81 of the sliding rails 80, keeping the respective tooth faces 71 in mesh with the teeth 62 of the gears 60.

As the sliding rails 80 are directly installed in the back cover 93 of the display screen inside the cover panel 91, space occupation is minimized.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A double sliding stability space-saving slide cover lifting structure used in an electronic device comprising a cover panel and a base member, the double sliding stability space-saving slide cover lifting structure comprising:
   two hinges respectively fixedly mounted in a respective recessed portion on a middle part of a top wall of said base member adjacent to two opposite lateral sides of said base member, each said hinge comprising a non-circular pivot shaft and a torque providing device;
   two sliding rail holders respectively connected to the non-circular pivot shafts of said two hinges and rotatable with the associating non-circular pivot shafts relative to said base member, each said sliding rail holder comprising a connection block connected to the non-circular pivot shaft of the associating hinge;
   two bearing members prepared by a high load strength material and respectively affixed to said sliding rail holders, each said bearing member having two grooves disposed at two opposite lateral sides thereof;
   two plastic slide guides respectively formed of a pair of channel bars and respectively fixedly mounted in the grooves of said bearing members, each said channel bar defining a sliding groove;
   two sliding rails bilaterally fixedly mounted on a bottom surface of said cover panel in a parallel manner, each said sliding rail comprising a flat, elongated base panel affixed to said cover panel, an angled rail extending along each of two opposite lateral side of said flat, elongated base panel and respectively slidably coupled to the sliding grooves of the channel bars of said plastic slide guides;
   an axle having two distal ends thereof respectively pivotally coupled to said sliding rail holders;
   two gears respectively mounted on said axle near said sliding rail holders, each said gear having the gear teeth thereof partially and upwardly inserted through said sliding rail holder and said bearing members; and
   two gear racks respectively affixed to the flat, elongated base panels of said sliding rails and respectively meshed with said gears;
   wherein said two sliding rails are moved with said cover panel in the sliding grooves of said plastic slide guides relative to said base member when said cover panel receives a horizontal push force, and said gear racks are simultaneously moved with said cover panel to rotate said gears, enabling the horizontal push force to be transferred through said gears to two opposite lateral sides of said base member to prohibit said cover panel from biasing during sliding movement; said gears are kept meshed with said gear racks constantly for enabling said cover panel to be turned about the non-circular pivot shafts of said hinges from a horizontal position to a tilted position relative to said base member.

2. The double sliding stability space-saving slide cover lifting structure as claimed in claim 1, wherein each said bearing member has a spring plate fixedly mounted at a rear end thereof, said spring plate comprises a mounting portion affixed to the associating bearing member and a spring leaf projecting into the sliding groove of one channel bar of the associating plastic slide guide and stopped against one angled rail portion of the associating sliding rail; each angled rail portion of each said sliding rail comprises a first notch and a second notch for selectively receiving the spring leaf of the associating spring plate.

3. The double sliding stability space-saving slide cover lifting structure as claimed in claim 1, wherein the flat, elongated base panel of each said sliding rail is affixed to a back cover of a display screen in said cover panel of said electronic device with screws.

4. The double sliding stability space-saving slide cover lifting structure as claimed in claim 1, wherein the flat, elongated base panel of each said sliding rail further comprises a plurality of round holes; each said gear rack further comprises a plurality of pins respectively inserted into the round holes of the respective sliding rail and heat sealed thereto.

5. The double sliding stability space-saving slide cover lifting structure as claimed in claim 1, wherein each said sliding rail holder comprises a non-circular coupling hole located on the connection block thereof and coupled to the non-circular pivot shaft of the associating hinge.

6. The double sliding stability space-saving slide cover lifting structure as claimed in claim 1, wherein the torque providing device of each said hinge comprises a concave wheel and a cam wheel mounted on the associating non-circular pivot shaft, a set of spring washers mounted on the associating non-circular pivot shaft and stopped against said concave wheel and said cam wheel, a flat washer mounted on the associating non-circular pivot shaft and stopped at one side of said spring washers against said concave wheel and said cam wheel, a locknut threaded onto one end of the associating non-circular pivot shaft and stopped at one side of said flat washer opposite to said spring washers, and a stop plate mounted on the associating non-circular pivot shaft and stopped between the associating bracket and said concave wheel.

7. The double sliding stability space-saving slide cover lifting structure as claimed in claim 6, wherein the stop plate of the torque providing device of each said hinge comprises a sector part adapted for stopping against a protruded block of the associating bracket to limit the angle of rotation of the associating non-circular pivot shaft relative to the associating bracket.

8. A double sliding stability space-saving slide cover lifting structure used in an electronic device comprising a cover panel and a base member, the double sliding stability space-saving slide cover lifting structure comprising:
   two hinges respectively fixedly mounted in a respective recessed portion on a middle part of a top wall of said base member adjacent to two opposite lateral sides of said base member, each said hinge comprising a non-circular pivot shaft and a torque providing device;
   two sliding rail holders respectively connected to the non-circular pivot shafts of said two hinges and rotatable with the associating non-circular pivot shafts relative to said base member, each said sliding rail holder comprising a connection block connected to the non-circular pivot shaft of the associating hinge;
   two bearing members prepared by a high load strength material and respectively affixed to said sliding rail holders, each said bearing member having two grooves disposed at two opposite lateral sides thereof;

two plastic slide guides respectively formed of a pair of channel bars and respectively fixedly mounted in the grooves of said bearing members, each said channel bar defining a sliding groove;

two sliding rails bilaterally fixedly mounted at two opposite lateral sides of a back cover of a display screen in said cover panel of said electronic device, each said sliding rail comprising a longitudinal slot and two rail portions arranged in a parallel manner in said longitudinal slot, the rail portions of said sliding rails being respectively slidably coupled to the sliding grooves of the channel bars of said plastic slide guides;

an axle having two distal ends thereof respectively pivotally coupled to said sliding rail holders;

two gears respectively mounted on said axle near said sliding rail holders, each said gear having the gear teeth thereof partially and upwardly inserted through said sliding rail holder and said bearing members; and two gear racks respectively positioned in the longitudinal slots of said sliding rails and respectively meshed with said gears;

wherein said two sliding rails are moved with said cover panel in the sliding grooves of said plastic slide guides relative to said base member when said cover panel receives a horizontal push force, and said gear racks are simultaneously moved with said cover panel to rotate said gears, enabling the horizontal push force to be transferred through said gears to two opposite lateral sides of said base member to prohibit said cover panel from biasing during sliding movement; said gears are kept meshed with said gear racks constantly for enabling said cover panel to be turned about the non-circular pivot shafts of said hinges from a horizontal position to a tilted position relative to said base member.

9. The double sliding stability space-saving slide cover lifting structure as claimed in claim 8, wherein each said bearing member has a spring plate fixedly mounted at a rear end thereof, said spring plate comprises a mounting portion affixed to the associating bearing member and a spring leaf stopped against one rail portion of the associating sliding rail; one rail portion of each said sliding rail comprises a first notch and a second notch for selectively receiving the spring leaf of the associating spring plate.

10. The double sliding stability space-saving slide cover lifting structure as claimed in claim 8, wherein each said sliding rail holder comprises a non-circular coupling hole located on the connection block thereof and coupled to the non-circular pivot shaft of the associating hinge.

11. The double sliding stability space-saving slide cover lifting structure as claimed in claim 8, wherein the torque providing device of each said hinge comprises a concave wheel and a cam wheel mounted on the associating non-circular pivot shaft, a set of spring washers mounted on the associating non-circular pivot shaft and stopped against said concave wheel and said cam wheel, a flat washer mounted on the associating non-circular pivot shaft and stopped at one side of said spring washers against said concave wheel and said cam wheel, a locknut threaded onto one end of the associating non-circular pivot shaft and stopped at one side of said flat washer opposite to said spring washers, and a stop plate mounted on the associating non-circular pivot shaft and stopped between the associating bracket and said concave wheel.

12. The double sliding stability space-saving slide cover lifting structure as claimed in claim 11, wherein the stop plate of the torque providing device of each said hinge comprises a sector part adapted for stopping against a protruded block of the associating bracket to limit the angle of rotation of the associating non-circular pivot shaft relative to the associating bracket.

* * * * *